(12) United States Patent
Atkinson et al.

(10) Patent No.: US 6,760,850 B1
(45) Date of Patent: Jul. 6, 2004

(54) METHOD AND APPARATUS EXECUTING POWER ON SELF TEST CODE TO ENABLE A WAKEUP DEVICE FOR A COMPUTER SYSTEM RESPONSIVE TO DETECTING AN AC POWER SOURCE

(75) Inventors: Lee W. Atkinson, Houston, TX (US); Rahul V. Lakdawala, Cypress, TX (US); Loren S. Dunn, Spring, TX (US); Paul G. Massey, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 09/628,739

(22) Filed: Jul. 31, 2000

(51) Int. Cl.[7] .............................. G06F 1/26; G06F 1/28; G06F 1/30
(52) U.S. Cl. ........................ 713/320; 713/300; 713/310; 713/32; 713/323; 713/324; 713/330; 713/340
(58) Field of Search ................................. 713/300, 320, 713/323, 324, 340, 310, 330, 322

(56) References Cited

U.S. PATENT DOCUMENTS

| 6,266,776 B1 | * | 7/2001 | Sakai ......................... 713/300 |
| 6,282,662 B1 | * | 8/2001 | Zeller et al. ................. 713/300 |
| 6,427,182 B1 | * | 7/2002 | Sugiura et al. ............. 710/303 |
| 6,496,881 B1 | * | 12/2002 | Green et al. ................ 713/322 |
| 6,591,368 B1 | * | 7/2003 | Ryu ........................... 713/323 |

FOREIGN PATENT DOCUMENTS

JP     04355810 A  * 12/1992  ............. G06F/1/30

OTHER PUBLICATIONS

Lomas, M.; Christianson, B.; "Remote booting in a hostile world: to whom am I speaking? [Computer security]", Computer, vol.: 28 Issue: 1, Jan. 1995, Page(s): 50–54.*
*A Technical Reference for Designing PCs and Peripherals for the Microsoft® Windows® Family of Operating Systems*; Chapter 6, Mobile PC 99, 1997–1999 Intel Corporation and Microsoft Corporation (35 p.).
*PCI Bus Power Management Interface Specification for PCI to CardBus Bridges*; Ken Stufflebeam, Proposal 0194P00x, Revision 0.2, Draft, Apr. 15, 1997 (62 p.).

* cited by examiner

*Primary Examiner*—Thomas Lee
*Assistant Examiner*—James K Trujillo

(57) ABSTRACT

A computer system that selectively disables power to wake on LAN (WOL) devices in the absence of AC power. In one embodiment, the computer system comprises a power supply and a power management controller. The power supply is configured to provide power to a wakeup device. The power management controller receives an AC voltage sense signal that indicates the presence or absence of an AC power source and enables the power supply to provide power to the wakeup device when the AC voltage sense signal is asserted. The power management controller preferably disables the power supply when the AC voltage sense signal is de-asserted. The computer system may operate in several states including an off state, a power on self test (POST) state, a working state, a trap state, and an armed state.

19 Claims, 6 Drawing Sheets

METHOD AND APPARATUS EXECUTING POWER ON SELF TEST CODE TO ENABLE A WAKEUP DEVICE FOR A COMPUTER SYSTEM RESPONSIVE TO DETECTING AN AC POWER SOURCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to remotely waking a computer that is in an off state. More particularly, it relates to power management methods for selectively enabling a computer wakeup device in response to the presence or removal of AC power.

2. Background of the Invention

Generally stated, the term "power management" refers to the ability of a computer system to conserve or otherwise manage the power that it consumes. Many personal computer systems conserve energy by operating in special low-power modes when the user is not actively using the system. Although used in desktop and portable systems alike, these reduced-power modes particularly benefit laptop and notebook computers by extending the battery life of these systems. Some computer systems automatically enter low-power mode when a user has not performed a certain action within a given period of time. For example, the computer might power down the monitor if the video display has not recently changed or may power down the hard drive if the user has not recently opened or saved any files onto the hard disk. If the computer detects a period of inactivity, the computer may enter a "deep sleep" mode in which power is completely cut off to all but a few devices within the computer. In addition, the user often can initiate the sleep mode through a menu in the operating system (OS) or by pressing a power button on the computer. Typically the memory contents are preserved so that the computer returns to the same state that it was in when the sleep mode began.

There are many ways that have been used to implement an energy-conserving, reduced-power mode. Examples include hard off (power is disconnected), soft off (power is supplied only to components which monitor activity external to the system), hibernated power state (contents of memory are stored on disk and current state of computer is preserved while power consumption is reduced to a minimum level), suspend mode (all central processor activities are halted, but power to memory is maintained and dynamic RAM is refreshed), and sleep mode (the clock signal is reduced or halted to some or all of the system components during periods of inactivity). The sleep and suspend modes may each be invoked at various levels, depending on the particular implementation of these modes, and recovery from these modes is implementation specific.

Although these reduced-power modes may render the computer temporarily or partially inoperable, the user can generally restore full-power, or "wake up" the computer, at any time. For example, the computer may automatically restore video power if the user moves the mouse or presses a key on the keyboard, or might power up the hard disk if the user attempts to open or save a file. The source of the triggering activity may come from a local mechanism (i.e. a switch or sensor of any kind such as a power switch, a reset switch, a pressable key, a pressure sensor, a mouse, a joystick, a touch pad, a microphone, or a motion sensor), or the trigger source may be remote. In addition, some computers have the capability to wake automatically in response to incoming phone calls detected by a modem or to wakeup messages received over a local area network (LAN). Sleep mode is often an attractive alternative to completely shutting the computer down, because the computer consumes little power during sleep mode and because waking up from sleep mode typically is much faster than rebooting the system.

Early implementations of the various power modes required the computer hardware itself to monitor user activity and determine the proper power state for each device in the computer system. These early computer systems included a read only memory (ROM) device that stored a set of instructions for the computer to follow in order to carry out power management functions. The set of instructions formed part of the Basic Input/Output System (BIOS) of the computer, which also included instructions for procedures such as accessing data on a hard or floppy disk drive and controlling the graphics display. The ROM device containing the BIOS is referred to as the "BIOS ROM". Because hardware-based power management instructions usually are included in BIOS, such a management scheme is commonly known as "BIOS power management". Under BIOS power management, conditions within the computer system that initiate power state transitions, such as button presses and periods of inactivity explained above, generate system management interrupt (SMI) signals to the central processing unit (CPU). Upon receiving an SMI, the CPU executes the BIOS power management instructions stored in ROM to change the power state.

More recently, the Advanced Configuration and Power Interface (ACPI) specification, written collaboratively by Intel, Microsoft, and Toshiba, has introduced the concept of managing power functions using the computer's operating system software (e.g., Windows® 98 and Windows® NT). Centralizing power management within the operating system, in contrast with earlier hardware-based power management techniques, allows computer manufacturers to make simpler, less expensive hardware components that do not have to manage their own power states. Instead, these devices need only to respond to power management commands from the operating system. In general, operating system-based power management enables the computer system to implement relatively complex power management procedures that may have been difficult, if not impossible, to realize using a more decentralized, hardware-based approach. In fact, implementing power control through ACPI instead of through traditional hardware methods can significantly reduce the power consumption of some computer systems. Operating system-based power management also provides the user with some level of power management control.

Under ACPI, a computer system can be placed in one of six graduated reduced-power system states, which do not necessarily correspond (in functionality or in name) to the power down modes recited above. The six system power states, S0, S1, S2, S3, S4, and S5 encompass varying levels of system activity ranging from fully operational (S0) to "soft off" (S5). Power states S1–S5 represent sleeping states in which the computer system is neither fully operational nor completely powered off. The sleep states generally encompass varying levels of system activity (or "context") and require different lengths of time (or "wakeup latencies") to return to full power. The S1, S2, and S3 states may be referred to as Suspend states. In all three cases, the system DRAM retains valid information including application status, OS status, and hardware context that is lost during Suspend. Because sleep state S5 represents the deepest sleep state, it may also be referred to equivalently as the "off" state or as the lowest-power state.

In both the S4 and S5 states, the CPU and its DRAM memory hold no valid information. Additionally, all power is expected to be removed from the system except for a small amount of logic that may respond to events such as actuation of a power button. The S4 and S5 states are electrically identical. The difference between these states lies in the source of CPU memory during wakeup. In S4, which may be referred to as the Hibernation state to distinguish it from the S5 Off state, the previous state of the CPU's memory has been stored to the hard drive. A transition back the S0 working state from the S4 hibernation state causes the CPU to load this memory from the hard drive and the operating system will resume the state it was in prior to entering the S4 hibernation state. The S5 OFF state, on the other hand, presumes the user will load the operating system into CPU memory from a completely uninitialized state.

Transitioning between the system power states generally requires cooperation between the operating system and the computer hardware. The computer provides a set of ACPI registers which the operating system can access. To transition to one of the sleep modes from full-power mode (S0), the operating system stores special sleep codes into a pair of ACPI control registers. The sleep code includes a sleep enable bit and three sleep-type bits. The sleep-type bits generally identify one of the power states S1–S5. Upon detecting that the operating system has set (or "asserted") the sleep enable bit, the computer places itself into a sleep mode as defined by the sleep-type bits.

As stated above, the operating system may direct the hardware to place itself into a sleep mode for a variety of reasons. For example, the computer hardware may provide a timer that expires after a predetermined time of inactivity within the system, prompting the operating system to place a sleep request into the sleep-type and sleep enable bits of the control register. Alternatively, the operating system may write a sleep request to the control register after detecting that the user has initiated a sleep mode through the software interface, pressed sleep button on the computer chassis, or simply closed the computer screen (e.g., on a portable computer). When the sleep enable bit of the control register is asserted, the computer system places itself into the low-power mode indicated by the value of the sleep-type bits.

The ACPI protocol also includes a status register to enable system wakeup. The status register includes a wake status bit. The wake status bit typically is set if the user presses a wakeup button or power button on the computer. Certain devices in the computer system, such as the modem or network interface card (NIC), also may cause the wake status bit to be set in response to incoming messages (e.g., phone rings or network "wakeup" messages). When the operating system detects that the wake status bit has been set, the operating system transitions computer operation to the S0 mode.

There are several existing power management systems which are designed to operate in a network environment. Also, the ability to remotely awaken a computer via a network increases its usability and maintainability. For example, a user can remotely retrieve files even when the computer was powered down, and a system administrator can perform system maintenance after hours without needing to physically visit each computer. The administrator may further be provided with the ability to boot each of the computers via a Preboot Execution Environment (PXE) boot. PXE refers to the loading of an executable image or operating system from a remote location. In this scenario, a system administrator may elect to implement a PXE boot in order to boot the remote computer using a master copy of the operating system rather than loading the OS configuration that exists on the local hard drive or floppy drive. Examples of when this could be desirable include virus scanning and executing automated maintenance software.

In one representative system for waking a computer from a local area network, a remote wake frame of data known as a "magic packet" is defined that includes the destination address repeated 16 times consecutively anywhere within the packet. While the computer is in the power down state, its network interface card (which remains powered) continually monitors all incoming message packets for one that has its destination address repeated 16 times. When the network interface card detects an incoming packet with this address sequence, the network interface card asserts a signal to wake the rest of the computer and then start the operating system. Such systems can be called Wakeup on LAN (WOL) capable.

In such systems, the network interface card consumes a significant amount of power (typically between 0.5 and 2 watts) as it monitors the network traffic. Although this amount of power drain is insignificant when a computer is hooked up to an AC power source (i.e., wall socket), it is substantially more than a user might expect in a battery-powered portable computer that is apparently "off".

In conventional portable, WOL-capable systems, the NIC is always powered on to monitor the network connection for wakeup packets. The power is derived either from the battery or, if plugged into an AC outlet, from the wall. As such, the computer draws power even when "off" (i.e., hard off or hibernation state) and even if no one is attempting to remotely awaken the computer. This power draw significantly shortens battery life and thus is undesirable to users.

In addition to providing power to the NIC, the power management controller must also be powered to detect wakeup events from the NIC and enable power to the CPU and the rest of the system. In order for WOL to be fully functional, the computer must be capable of providing power to the NIC and the power management controller even when the rest of the system is unpowered. This power requirement necessitates the addition of an auxiliary power supply that continually draws power from the source, whether it is a battery or an AC source. Unfortunately, the addition an auxiliary power supply adds to the manufacturing costs for the computer. Additionally, the dependence on an auxiliary power supply makes it difficult to implement WOL capability on computers that do not have an auxiliary power supply.

It is desirable, therefore, to provide a system that prolongs battery life while still being able to monitor the network connection for wakeup packets. Further, it would be desirable to implement WOL capability and prolong battery life in systems that do not contain an auxiliary power supply.

SUMMARY OF THE INVENTION

The above described issues are at least in part addressed by a computer system as disclosed herein. In one embodiment, the computer system comprises a power supply and a power management controller. The power supply is configured to provide power to a wakeup device. The power management controller receives an AC voltage sense signal that indicates the presence or absence of an AC power source and enables the power supply to provide power to the wakeup device when the AC voltage sense signal is asserted. The power management controller preferably disables the power supply when the AC voltage sense signal is de-asserted. The computer system may operate in several states including an off state, a power on self test (POST) state, a working state, a trap state, and an armed state. Preferably in the off state the wakeup device is unpowered and in the armed state the wakeup device is powered. When the AC voltage sense signal becomes asserted, the computer system enters the POST state and the CPU executes basic input/output system (BIOS) code to conduct a POST sequence and to place the computer system into the armed state. The presence of the armed state in addition to the off state may advantageously provide a means for extending battery life in a portable computer.

BRIEF DESCRIPTION OF THE DRAWINGS

A better understanding of the present invention can be obtained when the following detailed description of the preferred embodiment is considered in conjunction with the following drawings, in which.

NOTATION AND NOMENCLATURE

Figure 1:
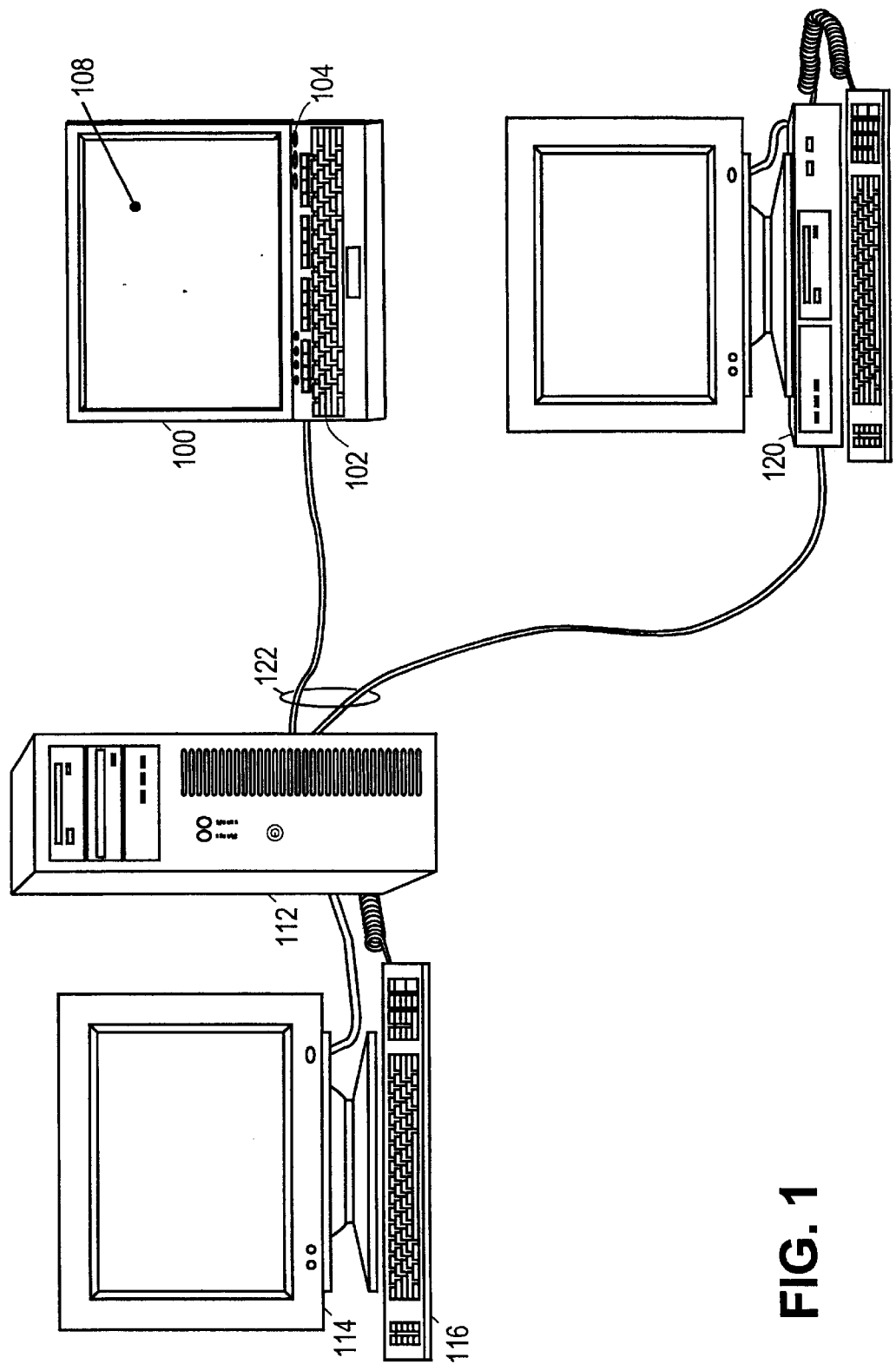
FIG. 1 is an illustrative diagram of a simple computer network which supports transmission of wake-up packets.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

FIG. 1 shows an example of a computer network representing a preferred embodiment, in which a central server 112 is coupled to a portable computer 100 and a second computer 120 by network connections 122. Computers 100, 120 may preferably be "client" computers. Although a client/server configuration is shown, the computer network may also be an enterprise network, a peer network, or any other suitable network configuration. It should be appreciated that any number of computers can be coupled to server 112.

A system administrator operating at a terminal 114 with input device 116 (e.g., a keyboard) can cause transmission of a network data packet to first and second computers 100, 120 to instruct either of the computers 100, 120 to awaken. Advanced Micro Devices. (AMD) has proposed a "Magic Packet(TM) Technology" that supports this ability, and Microsoft has patented a "packet-matching" method that also supports this ability. Microsoft's patent is U.S. Pat. No. 5,802,305, incorporated herein by reference. In essence, network interface cards in computers 100, 120 continually scan incoming data packets for a wakeup packet corresponding to that computer even when the computers are in a power down state. Upon detection of a packet that qualifies as a wakeup packet, the network interface card sends a signal to awaken the computer. In one embodiment, the network interface card alerts a power management controller to power up the computer.

Figure 2:
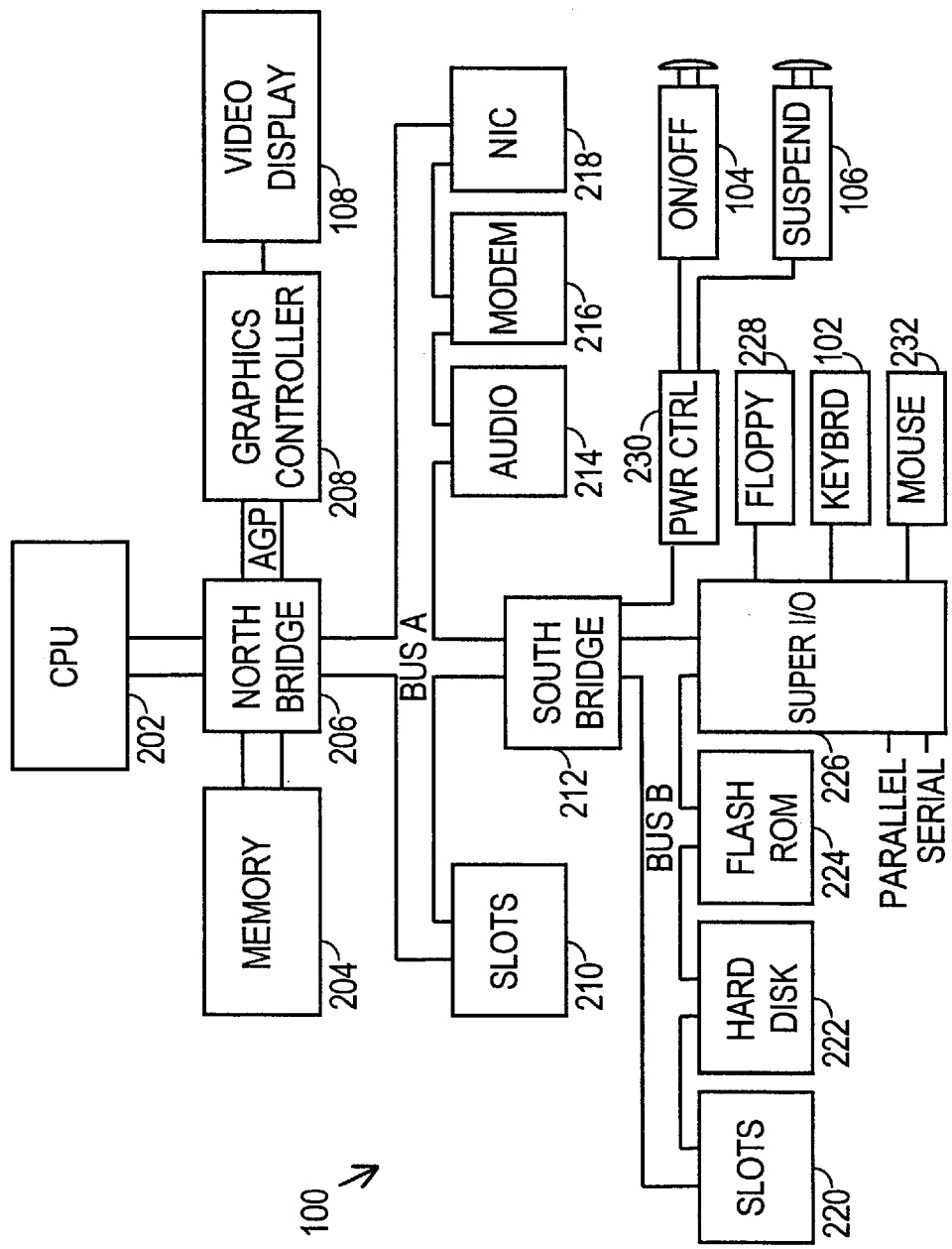
FIG. 2 is a functional block diagram of a conventional portable computer.

Referring to FIG. 2, the portable computer 100 generally includes a central processor unit (CPU) 202, a main memory array 204, and a bridge logic device 206 coupling the CPU 202 to the main memory 204. The bridge logic device is sometimes referred to as a "North bridge" for no other reason than it often is depicted at the upper end of a computer system drawing. The North bridge 206 couples the CPU 202 and memory 204 to various peripheral devices in the system through a primary expansion bus (Bus A) such as a Peripheral Component Interconnect (PCI) bus or some other suitable architecture. For clarity in the ensuing discussion, it will be assumed that Bus A is a PCI bus, but no such limitation to the scope of the claims is implied. Publications that describe the PCI bus include the PCI Specification, Rev. 2.2, and Power Management Specification 1.1, all published by the PCI Special Interest Group. The principles taught in these documents are well known to those of ordinary skill in the art and are herein incorporated by reference.

The North bridge logic 206 also may provide an interface to an Accelerated Graphics Port (AGP) bus that supports a graphics controller 208 for driving the video display 108. If the computer system 100 does not include an AGP bus, the graphics controller 208 may reside on the primary expansion bus, Bus A.

Various peripheral devices that implement the Bus A protocol may reside on Bus A. For example, an audio card 214, a modem 216, and network interface card (NIC) 218 are shown coupled to Bus A in FIG. 2. The audio card 214 allows for the generation of sounds via speakers (not shown), the modem 216 generally allows the computer to communicate with other computers or facsimile machines over a telephone line, an Integrated Services Digital Network (ISDN), or a cable television connection, and the NIC 218 permits communication between computers over a local area network (LAN) (e.g., an Ethernet network card or a Cardbus card). These components may be integrated into the motherboard or they may be plugged into expansion slots 210 that are connected to Bus A.

If other, secondary expansion buses are provided in the computer system, as is typically the case, each secondary expansion bus (e.g., Bus B) is coupled to the primary expansion bus (Bus A) by another bridge logic device 212. This bridge logic 212 is sometimes referred to as a "South bridge," reflecting its location vis-à-vis the North bridge 206 in a typical computer system drawing. An example of such bridge logic is described in U.S. Pat. No. 5,634,073, assigned to Compaq Computer Corporation. Various components that understand the bus protocol of Bus B may reside on this bus, such as hard disk controller 222, Flash ROM 224, and Super I/O controller 226. Slots 220 may also be provided for plug-in components that comply with the protocol of Bus B.

Flash ROM 224 stores the system BIOS code that is executed by CPU 202 during system initialization. The Super Input/Output (Super I/O) controller 226 typically interfaces to input/output devices such as a keyboard 102, a pointer device such as a mouse 232, a floppy disk drive 228, a parallel port, and a serial port. Although not specifically shown in FIG. 2, the Super I/O controller 226 also includes a battery-backed real time clock (RTC) and configuration memory (CMOS).

Referring still to FIG. 2, the South bridge 212 often includes additional logic such as an interrupt controller, timers, and a power management controller 230 (shown separately). The counter/timer (not shown) may be used to track the activities of certain components such as the hard disk 222 and traffic on the primary expansion bus (Bus A), and induce a sleep mode or reduced power mode after a predetermined time of inactivity. The power management controller 230 handles the power management functions, e.g., reducing or terminating power to various system components such as the disk drives 222, 228, and blocking the clock signals that drive components such as the CPU 202 and the bridge devices 206, 212 thereby inducing a sleep mode in the expansion buses. Depending on the implementation of the power management functionality, the South bridge 212 may assert a System Management Interrupt (SMI) (not shown) to cause the operating system to initiate a power mode transition or simply to alert the operating system of an impending transition. The user can trigger the power mode transition by pressing a power button 104 or a suspend switch 106. If desired, the switches 104, 106 can be combined in a single button.

Power management in a preferred embodiment of a portable computer is now described with reference to FIG. 3. Voltage to the main power supply 306 is supplied via a DC voltage source (e.g., battery) or an AC voltage source (e.g., wall outlet). Like all computers, the AC voltage is rectified and transformed to the appropriate DC voltage level in an AC/DC converter 302. The rectified and transformed AC power is applied through a diode 310 to prevent battery drain when the AC power is removed. A power switch 304 is controlled by power management controller 320 to supply voltage to the main power supply 306. When the power management controller 320 closes switch 304, power is supplied to the CPU 202 and other peripherals allowing the computer to boot and start the operating system. The power management controller 320 in this embodiment is comprised of the same core logic used in conventional WOL capable computers and some additional logic which will be described below.

A network device such as a modem or NIC 218 can awaken the computer system from the suspend state in response to a ring signal or a wake-up packet, for example, from the network 312. Upon detecting any such trigger, the device asserts a wake-up signal (such as the Power Management Event, PME#, signal on the PCI bus) 314 to the power management controller 320. Power management controller may then notify the operating system to awaken the computer.

As with conventional WOL capable computers, the auxiliary power supply 318 supplies power to the power management controller 320 and NIC 218. This auxiliary power supply 318 ensures that WOL is possible even when the system power switch 304 is in the off position. In conventional WOL capable computers, the auxiliary power supply is unswitched and continually draws current from the voltage source, regardless of whether it is an AC or DC source. A conventional WOL capable portable computer system is unable to selectively disable power to wakeup devices such as the NIC 218. This particular implementation of the preferred embodiment inserts a logic controlled switch 322 between the power source and the wakeup device 218. This switch 322 is controlled by an AC voltage sense signal 308 and an on/off signal 324 provided by the power management controller 320.

The AC voltage sense signal 308 is common to many conventional portable computers. Portable computers generally have this AC voltage sense signal 308 or some other kind of detection means for the presence of AC power because of their dual power source capability (i.e., battery and AC power). The power management controllers in these conventional computers may take this signal 308 into account when performing power management tasks. This particular implementation uses this signal in an expanded capacity as described more thoroughly below.

The on/off signal 324 from the power management controller 320 is a status/override signal. This signal is asserted by the power management controller 320 when the computer is in any state other than the S4/S5 OFF state. The power management controller 320 may also assert this signal in response to a user-controlled override request. In such a case, the on/off signal 324 will remain asserted in all states including the S4/S5 OFF state.

The AC voltage sense signal 308 and on/off signal 324 are logically ORed 326 such that the assertion of either causes the closure of switch 322 and allows power to flow to the NIC 218. This means that if the portable computer is powered by an AC power source or if the portable computer is in On or Suspend Mode, WOL capability is enabled. If there is no AC power source and the computer is in the OFF state, the NIC 218 is disconnected from the power source and WOL is disabled. The system may have a user-settable forced-enable or "override" command in the event a user wants WOL capability while operating under battery power. In such a case, the power management controller 320 will assert the on/off signal 324 causing the auxiliary switch 322 to close thereby supplying battery power to the NIC 218. The user should expect the additional drain to shorten battery life. The advantage of this embodiment is that OFF mode battery consumption is controlled by the user. The user can disable the WOL capability to save battery power or enable WOL if desired.

Figure 3:
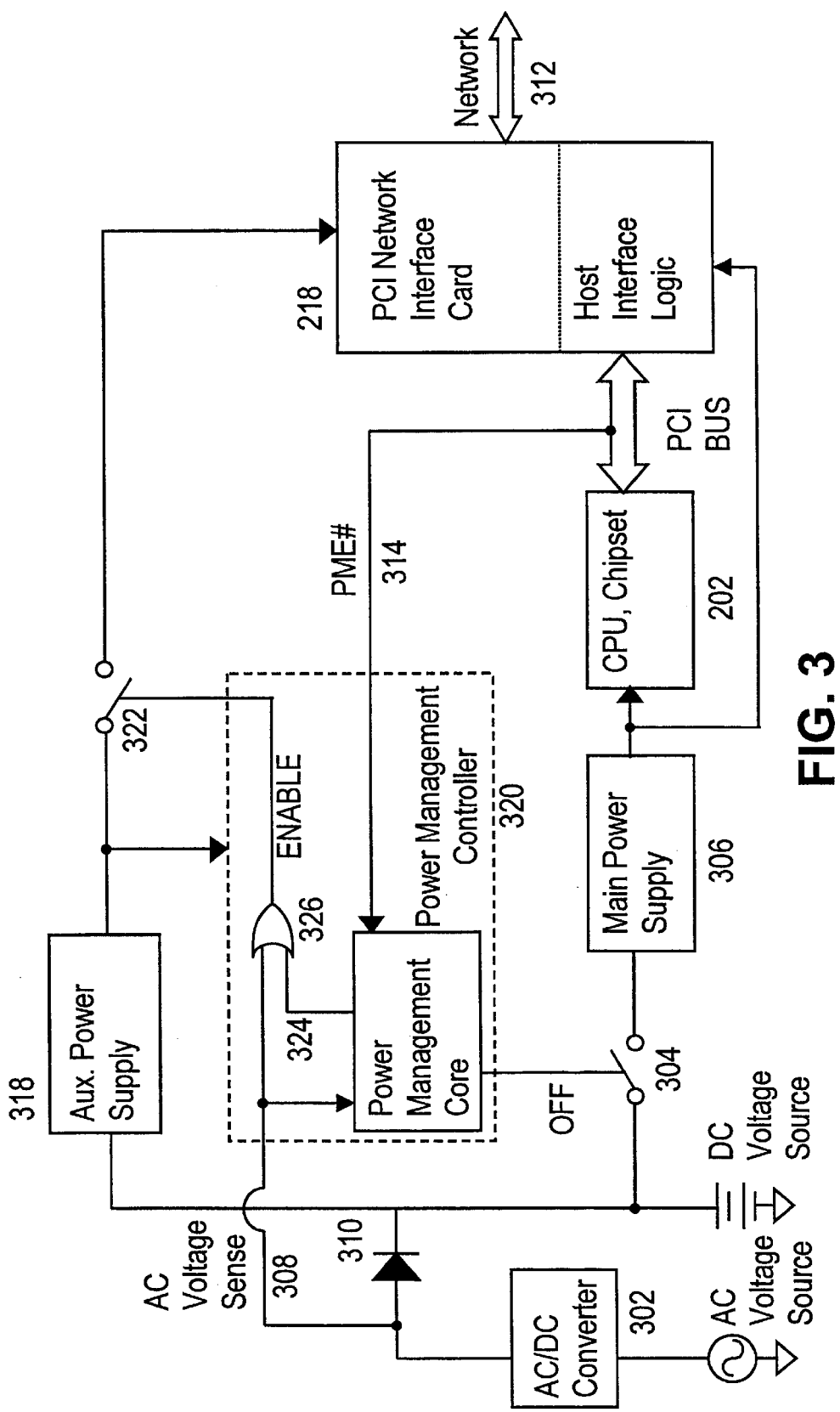
FIG. 3 is a functional block diagram of a preferred embodiment of the power management in a Wakeup on LAN capable portable computer.

Another feature of the preferred embodiment shown in FIG. 3 is that the wakeup device (e.g., NIC) shall have its wakeup context restored upon the assertion of AC power. Wakeup context refers to the proper state of the WOL feature (i.e., enabled or disabled). It is desirable for the computer to properly enable or disable WOL capability after power to the wakeup device is intentionally or unintentionally removed. Consider the event where AC power is applied to a battery-powered portable that is in the OFF state with WOL disabled. The assertion of the voltage sense signal 308 causes switch 322 to close, thereby providing power to NIC 218. Once powered, most NIC devices will reconfigure themselves from internal non-volatile memories. Today, this is done by the Intel and 3Comm NIC solutions, which use a local non-volatile memory source to appropriately configure the NIC. However, there exist some "dumb" devices such as Cardbus controllers that must have their wakeup contexts restored by the CPU. As will be explained more fully below, the power management controller 320 may be configured to detect assertion of voltage sense signal 308 and to close power switch 304 to enable the system to begin a power-on self-test (POST) sequence. As part of the POST, the CPU may configure the dumb wakeup devices, and then instruct the power management controller to re-open power switch 304.

Figure 4:
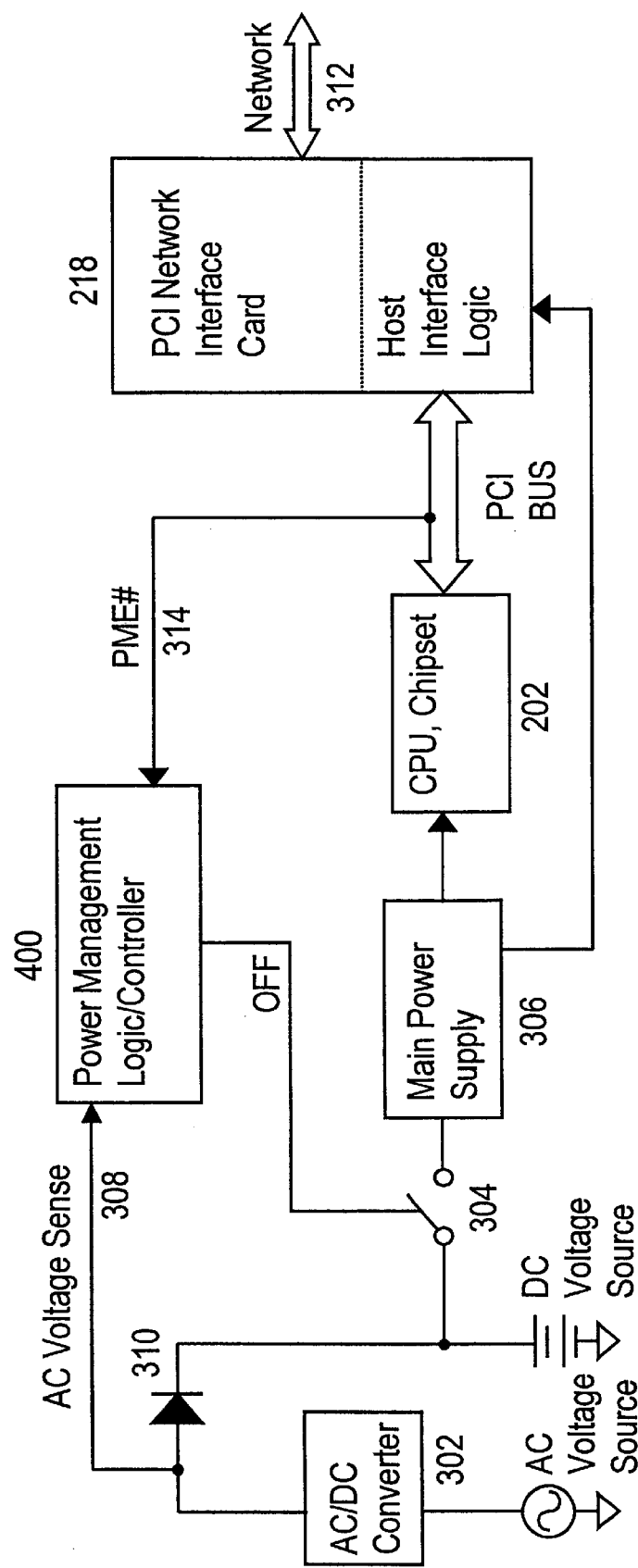
FIG. 4 is a functional block diagram of a preferred embodiment of the power management in a Wakeup on LAN capable portable computer that does not use an auxiliary power supply.

The preferred embodiment shown in FIG. 3 includes an auxiliary power supply 318. It is desirable, however, to provide the user with control over power management without the use of an auxiliary power supply 318 for several reasons. Removing the auxiliary power supply reduces manufacturing costs and it is feasible that one would need to enable WOL capability on a network computer that was not manufactured with an auxiliary power supply such as the alternative embodiment in FIG. 4. In the computer shown in FIG. 4, if the main power switch 304 is in the off position, the NIC 218 could not remain powered and a WOL event would not be possible, which means the computer system can only be powered on by physically actuating a power switch.

Conventional computer systems rely on the idea that power management controllers 400 must physically remove power from the CPU 202, chipset, and other devices not needed for WOL readiness. However, power can also be managed by the simple stopping of clocks to logic devices and virtually all CMOS logic has the ability to enter a low power mode by a CPU command. These alternative power management methods do not require the removal of power. The alternative embodiment uses the system BIOS software to take advantage of existing low power modes. No unique hardware is needed, but instead, the embodiment simply emulates the OFF mode despite the fact that switch 304 is closed. To more clearly explain this particular embodiment, the state diagram in FIG. 5 will now be described and then related to the functional block diagram in FIG. 4.

Figure 5:
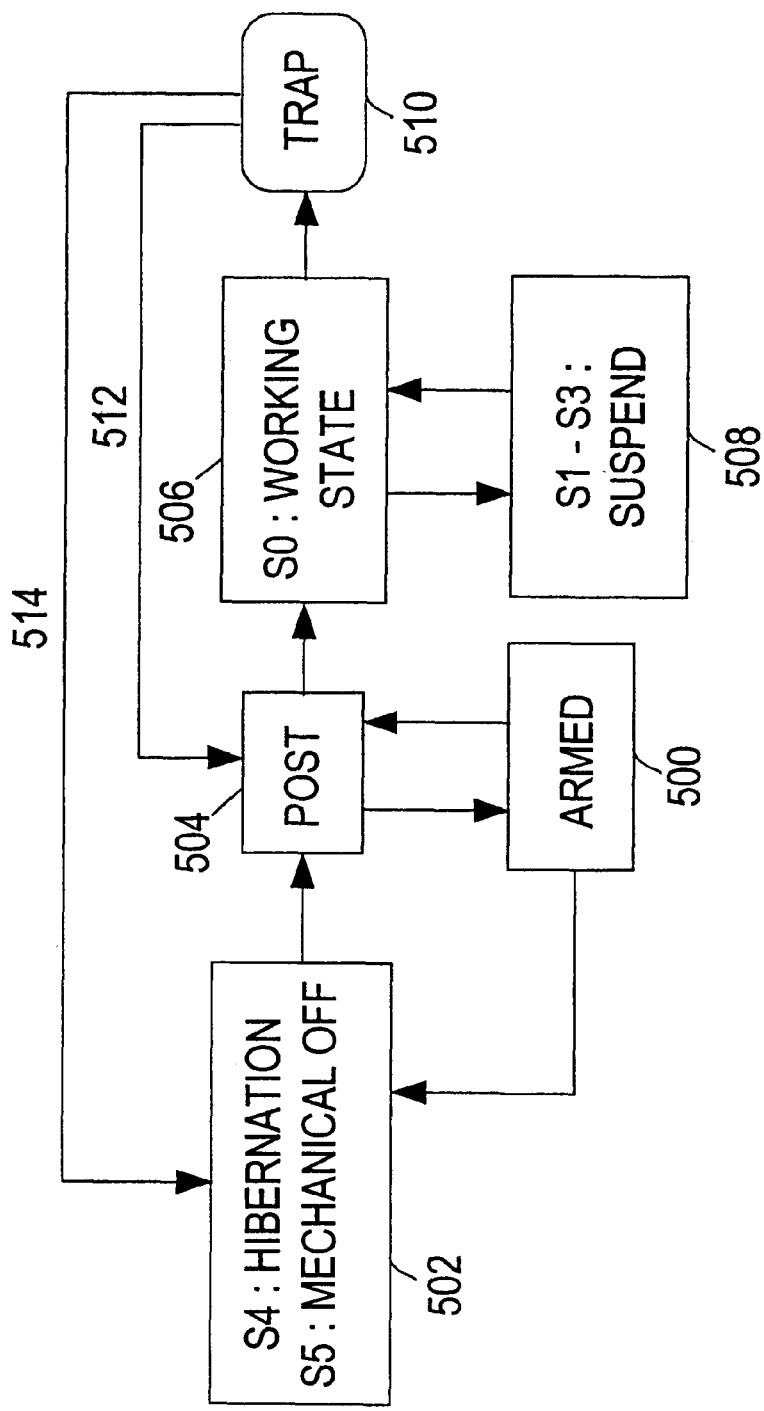
FIG. 5 is a state diagram of a preferred embodiment of the power states in a computer.

The relationship between the ACPI power modes discussed in the background is displayed in the state diagram shown in FIG. 5. The OFF state 502 represents either the S4 or S5 state. After some power-on event occurs, the system will transition out of the S4/S5 OFF state, boot to BIOS ROM and perform a Power On Self Test (POST) 504. POST does not involve the operating system (OS) at all, but is system-specific code that configures and tests hardware components of the computer.

After basic configuration of the PC is complete, the BIOS passes control to the operating system and the computer transitions to the S0 Working state 506. The S0 Working State 506 describes the condition where the Operating System (OS) has control of the computer and is performing work. Since the POST state does not involve the OS, the OS only knows that the computer has transitioned from the OFF state 502 to the Working state 506. Hence, as far as the OS and the related ACPI power modes are concerned, the POST sequence is executed as if the computer were still in the OFF state 502.

Shutting off the system from the S0 state 506 will cause a transition back to the S4/S5 state 502. The decision over whether to use either the S4 or S5 state will depend on the OS. In conventional WOL enabled hardware and in this preferred embodiment, the system does not transition directly from the S0 state 506 to the S5 state 502. Instead, the system first transitions to a TRAP state 510. In the TRAP state, code in the system ROM is executed to configure the power management circuitry for the WOL resume. As is the case with POST, the OS is not involved in the execution of TRAP code.

In a conventional WOL capable computer, after the TRAP code enables the wakeup sources (i.e., configures the power management controller and commands the network card to search for wakeup events), the system may be taken to the S4/S5 OFF state 502 via transition 514. In this case, the main power supply switch 304 is disabled and virtually the entire system is powered off. In the absence of an auxiliary power supply as is the case in FIG. 4, there is no way for the NIC 218 to remain powered and thus a wakeup event from LAN is not possible. This alternative embodiment solves this problem and allows a computer that does not have an auxiliary power supply to enter into a WOL enabled state.

From the S0 working state 506, the OS may transition to a low-power S1–S3 Suspend state 508. A resume transition from a Suspend state back to the Working S0 state 506 can be initiated by wakeup events such as a key press, motion of a pointing device, a modem ring or a NIC wakeup.

FIG. 5 also includes an Armed state 500, which represents a WOL enabled state. This Armed state 500 is created by the BIOS code and, like the POST and TRAP sequences, does not involve nor require the existence of the operating system. This Armed state 500 provides an intermediate, low power alternative to residing in either the OFF state 502 or the Working state 506. The system DRAM may be completely invalid and much of the system may be completely uninitialized. In the Armed state 500, the NIC device 218 is powered and WOL is enabled. The system can be in an electrical Suspend state, but to the OS, the computer is still in an S4/S5 OFF state 502.

Again referring to FIGS. 4 and 5, consider the example where a portable computer is in the OFF S4/S5 state 502. If the computer is running on battery power alone, it will remain in that state. In this embodiment, if the computer is connected to AC power, the power management controller 400 will detect the presence of AC power via the AC Voltage sense signal 308 and close the main power switch 304. This will supply power to the CPU 202 and cause the system to transition to POST 504. For conventional systems, assertion of AC power will not transition the system from an OFF state into POST.

The power management controller 400 and POST code 504 in this embodiment will recognize that the power-on event was only the availability of AC power and not any traditional wakeup event such as a Power button press or RTC alarm. In this case, the POST code 504 will react to the AC power wakeup by enabling the wakeup devices and entering the Armed state 500. In the event AC power is removed, the system will transition from the Armed state 500 to the S4/S5 OFF state 502. The system can also exit the Armed state 500 for any traditional wakeup event such as a NIC WOL or a Power button press to complete the POST and proceed to the S0 Working State 506.

As discussed above, shutting off the system from the S0 Working State 506 will cause a transition to the TRAP state 510. The TRAP code may be executed to check the status of the AC voltage sense signal and determine the proper WOL configuration. If AC power is present or if the user has enabled WOL from OFF while under battery power, the system will transition from the TRAP state to the Armed state 500 via the POST state 504 through transition 512. If no AC is present or if WOL is not requested, the system will transition via path 514 to the S4/S5 OFF state 502.

Figure 6:
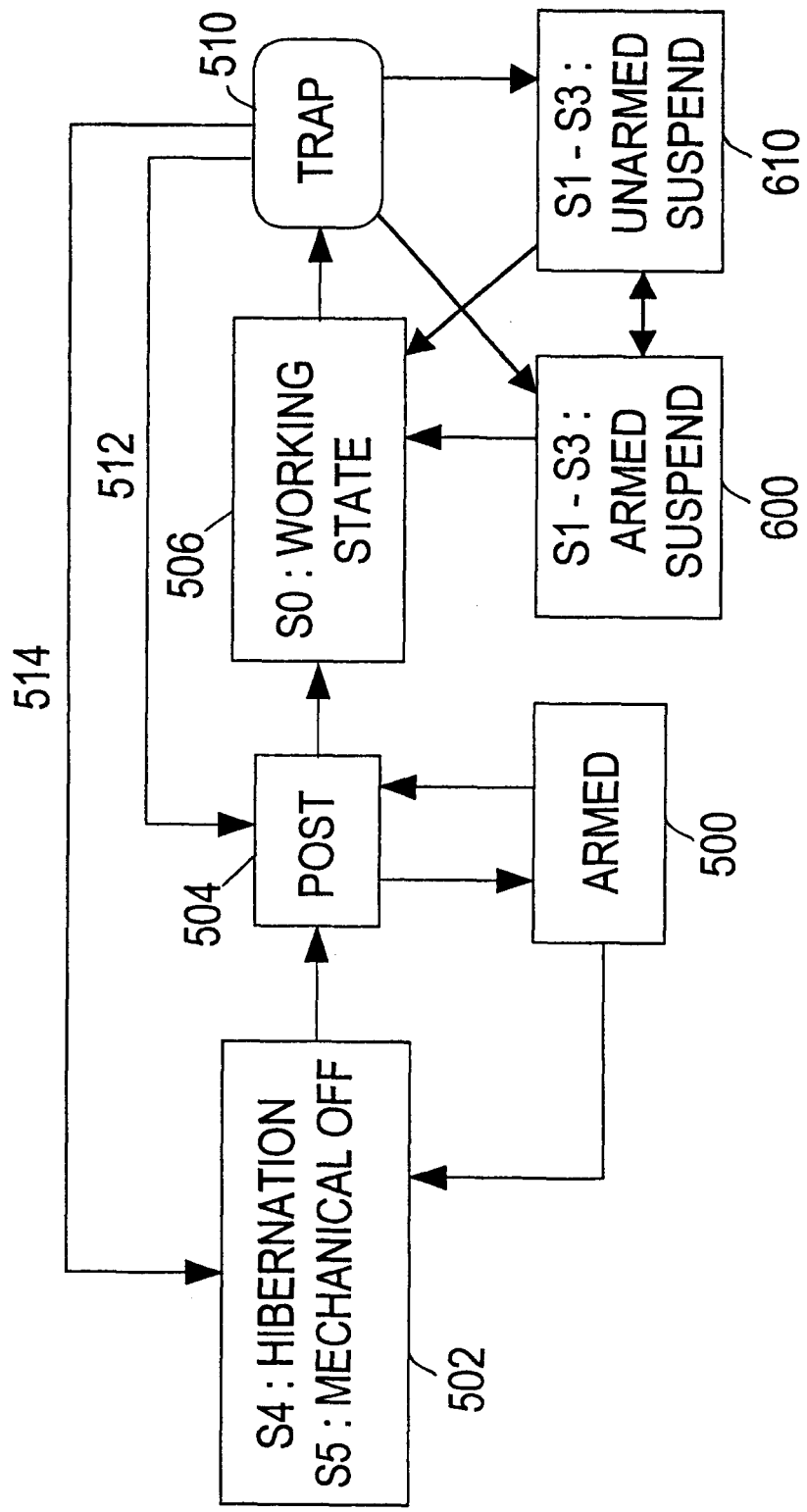
FIG. 6 is an alternative embodiment of a computer's power states.

As shown in FIG. 6, there may alternatively be two separate Suspend states 600 and 610 that are distinguished only by the context of the wakeup device. For instance, suppose a computer has been idle for some time and the operating system commands a transition to a low-power state to conserve energy. Prior to entering a Suspend state, TRAP code 510 may be executed to check the status of the AC voltage sense signal and determine the proper WOL configuration. If AC power is present or if the user has enabled WOL from OFF while under battery power, the system will transition from the TRAP state to the Armed Suspend state 600. If no AC power is present or if WOL is not requested, the system will transition to the Unarmed Suspend state 610.

As mentioned above, the only difference between the two Suspend states lies in the wakeup context of the network device. The ACPI power state of the rest of the computer system is identical for these two Suspend states. In the Armed Suspend state 600, the wakeup device is armed and searches the network for wakeup events. The computer system will transition from the Armed Suspend state 600 to the Working state 506 in response to network wakeup events. In the Unarmed Suspend state 610, the wakeup device is deactivated and transitions to the Working state 506 are only possible in response to conventional wakeup events such as RTC alarms and button presses.

Transitions between the Armed Suspend state 600 and the Unarmed Suspend state 610 are possible in response to changes in power source. If the system is in the Armed Suspend state 600 and AC power is removed, power to the wakeup device will be removed and the system will transition to the Unarmed Suspend state 610. Conversely, if the system is in the Unarmed Suspend state 610 and AC power is applied, the wakeup device will be activated and the system will transition to the Armed Suspend state 600.

In an alternative embodiment, the system may periodically wake up from the S4/S5 OFF state 502 and look for NIC traffic. Instead of arming the network device (i.e., transitioning to the Armed state 500) only upon the application AC power, the system would occasionally test if a network connection has been made. From the OFF state 502, the system will periodically wakeup and enter the POST state 504. The periodic wakeup could be from the RTC timer or as directed by the embedded microprocessor. In the POST state 504, the network device is activated to see if a network connection or network wakeup event are present. In one scenario, if network traffic is detected, the system will transition to the Armed state 500 and the network device will monitor the network for wakeup events. In another scenario, if a wakeup event is detected immediately upon completing POST 504, the system will transition to the S0 Working state, 506. In the absence of network traffic and/or a network wakeup event, the system will return to the OFF state 502.

Other embodiments exist that will still operate within the framework of the state space diagram shown in FIGS. 5 and 6. For example, instead of transitioning from the POST state to the S0 Working State, a transition from POST directly to NIC control via a PXE boot is possible. As discussed previously, a PXE boot is advantageous when a user wishes to boot a computer at a remote location. Another example of an alternative embodiment includes a system that will periodically activate the network device to check for network traffic and/or network wakeup events from the Unarmed Suspend state 610. In other words, regardless of the power source present (AC or DC), the system would periodically, and without any user intervention, transition from the Unarmed Suspend state 610 to the Armed Suspend state 600 to monitor the network. The periodicity of these checks may help to preserve battery life.

Still another embodiment involves the use of a Cardbus connection to a network. One issue with implementing a Cardbus card as a wakeup device lies in the configuration of the card during power up. As discussed previously, the network card must be capable of configuring itself properly after the assertion of power. This is certainly feasible with NIC devices that use non-volatile memory to store the proper configuration. However, many devices that may generate a wakeup event (e.g., a Cardbus) do not have any provision for local non-volatile memory. Furthermore, a Cardbus is uniquely different from a NIC in that an intermediate Cardbus bridge or controller is required for the host computer to communicate with the Cardbus at a specific address. The Cardbus bridge is a device such as the Texas Instruments PCI1220 Controller. The bridge is necessary to provide address translation for memory and input/output for the cardbus. In using a Cardbus as a WOL capable network device, it is imperative that the Cardbus bridge be properly configured on power up. Once configured, the Cardbus bridge could then recognize and configure the Cardbus card. This embodiment may optionally use commands from the BIOS POST routine to configure the Cardbus bridge and subsequently, the Cardbus card itself.

The above discussion is meant to be illustrative of the principles of the present invention. Numerous variations and modifications will become apparent to those skilled in the art once the above disclosure is fully appreciated. For example, in addition to when AC power is removed, the disabling of WOL devices may also be done when it is determined that the computer has been disconnected from external battery packs, solar cells, or other external power sources. It is intended that the following claims be interpreted to embrace all such variations and modifications.

What is claimed is:

1. A computer system that comprises:
   a CPU;
   a memory coupled to the CPU, wherein the memory stores power on self test (POST) code; and
   a power management controller coupled to the CPU, wherein the power management controller is configurable to receive an AC voltage sense signal, wherein assertion of the AC voltage sense signal indicates the presence of an AC power source, and wherein, if the power management controller is so configured by a user, the power management controller causes the CPU to transition from a low power state to an operable state and to execute the POST code to enable a wakeup device, following which the computer system, with the wakeup device still enabled, is in a low power state capable of transitioning to a working state when the wakeup device detects a wakeup signal.

2. The computer system of claim 1, wherein the computer system operates in a plurality of states including an off state, a power on self test (POST) state, the working state, a trap state, and an armed state, wherein in the off state the wakeup device is unpowered and in the armed state the wakeup devices is powered.

3. The computer system of claim 2,
   wherein when the AC voltage sense signal becomes asserted the computer system enters the POST state and the CPU executes basic input/output system (BIOS) code, wherein the BIOS code configures the CPU to conduct a POST sequence and to place the computer system into the armed state.

4. The computer system of claim 3, wherein in the trap state, the CPU configures the wakeup devices to enable wakeup on LAN (WOL) and places the computer system into the armed state if the AC voltage sense signal is asserted.

5. The computer system of claim 4, wherein in the trap state, the CPU configures the wakeup devices to enable wakeup on LAN (WOL) and places the computer system into the armed state if a forced-enable bit is set.

6. The computer system of claim 3, wherein in the presence of a network connection, the wakeup device is configured to monitor the network for wakeup events; and wherein the CPU commands the computer system to periodically transition from the off state to the POST state to execute BIOS code and power the wakeup devices.

7. The computer system of claim 6, wherein in the POST state, if the wakeup devices detects the existence of a network connection, the CPU and BIOS code place the computer into the armed state; and wherein if the wakeup devices detects the existence of a network wakeup event, the CPU and BIOS code place the computer into the working state; and wherein if the wakeup devices detects neither the existence of a network connection nor a network wakeup event, the CPU and BIOS code place the computer into the off state.

8. The computer system of claim 2, wherein the computer system is configured to transition from the armed state to the off state when the AC voltage sense signal becomes de-asserted.

9. The computer system of claim 2, wherein the power supply is the primary power supply used to supply power to the computer system.

10. A method comprising:

detecting whether an AC power source is present;

asserting an AC voltage sense signal only when an AC power source is present;

disabling power to a wakeup device according to a user configuration of the wakeup device and when the AC voltage sense signal is de-asserted;

conducting a power on self test (POST) in response to the assertion of the AC voltage sense signal; and entering an armed state in which power is supplied to the wakeup device in response to the POST.

11. The method of claim 10, further comprising:

providing power to the wakeup device if an override signal is asserted.

12. The method of claim 10, further comprising:

entering a working state in response to a wake command;

entering a trap state in response to a shutdown command, wherein if the AC voltage sense signal is asserted in the trap state the wakeup device is configured to enable wakeup on LAN (WOL) before the computer system enters the armed state, wherein if the AC voltage sense signal is de-asserted in the trap state the computer system enters an off state.

13. The method of claim 10, further comprising:

transitioning from the armed state to the off state if the AC voltage sense signal is de-asserted.

14. A computer system that comprises:

a power supply configured to power a plurality of computer components from a power source;

a wakeup device configurable to awaken the computer system;

a CPU that executes POST code to enable or disable the wakeup device according to user input and a status of an AC voltage sense signal;

a power switch coupled between the power supply and the wakeup device; and a power management controller coupled to the power switch to selectively block power to the wakeup device when the computer system is disconnected from an external power source.

15. The computer system of claim 14, wherein the power supply is an auxiliary power supply, and wherein the computer system further comprises;

a main power supply configured to power the CPU.

16. The computer system of claim 15, further comprising:

a main power switch coupled between the power source and the main power supply.

17. The computer system of claim 16, wherein if the computer is off, the power management controller is configured to close the main power switch when the computer system becomes connected to the external power source.

18. The computer system of claim 17, wherein the CPU executes a power-on self-test (POST) sequence and enables the wakeup device when the computer system becomes connected to the external power source.

19. The computer system of claim 18, wherein after enabling the wakeup device, the CPU commands the power management controller to open the main power switch unless a power-on event is detected.

* * * * *